(12) United States Patent
Stack et al.

(10) Patent No.: US 11,230,187 B2
(45) Date of Patent: Jan. 25, 2022

(54) CLOSE-OUT ASSEMBLY AND A METHOD OF MANUFACTURING THE CLOSE-OUT ASSEMBLY

(71) Applicant: GM GLOBAL TECHNOLOGY OPERATIONS LLC, Detroit, MI (US)

(72) Inventors: Matthew M. Stack, Macomb Township, MI (US); Omair Mustafa, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 16/665,441

(22) Filed: Oct. 28, 2019

(65) Prior Publication Data

US 2021/0122234 A1 Apr. 29, 2021

(51) Int. Cl.
*B60K 15/05* (2006.01)
*B60K 15/03* (2006.01)

(52) U.S. Cl.
CPC .... *B60K 15/05* (2013.01); *B60K 2015/03447* (2013.01); *B60K 2015/0553* (2013.01)

(58) Field of Classification Search
CPC ............... B60K 15/04; B60K 15/05; B60K 2015/03447; B60K 2015/0553; B60K 2015/053; B60K 2015/0451; E05Y 2900/534
See application file for complete search history.

(56) References Cited

U.S. PATENT DOCUMENTS

2009/0189410 A1  7/2009 Gurtatowski et al.
2013/0249235 A1*  9/2013 Lorenc ............... B60K 15/05
                                             296/97.22

\* cited by examiner

*Primary Examiner* — Dennis H Pedder
*Assistant Examiner* — Joyce Eileen Hill
(74) *Attorney, Agent, or Firm* — Quinn IP Law

(57) ABSTRACT

A close-out assembly includes a housing and an inlet. The housing includes a wall that surrounds an opening. The wall includes an outer edge adjacent to the face plate and an inner edge. The inlet is coupled to the wall, and the inlet is accessible through the opening. The assembly includes a door coupled to the housing that is movable relative to the housing. The assembly includes a seal formed to the wall at the outer edge of the wall and the inner edge of the wall. The door engages one part of the seal when the door is in a closed position, and the inlet engages another part of the seal regardless of the position of the door. A method of manufacturing the assembly includes positioning a housing relative to a mold, and molding an elastomeric material to the housing using the mold to form a seal.

19 Claims, 3 Drawing Sheets

CLOSE-OUT ASSEMBLY AND A METHOD OF MANUFACTURING THE CLOSE-OUT ASSEMBLY

INTRODUCTION

A vehicle may include a body panel and a door coupled to the body panel. The door may be accessible from outside of the vehicle to recharge or refuel the vehicle. Additionally, the door may be movable relative to an outer surface of the body panel to access a port in order to recharge or refuel the vehicle. The door may include an inner surface that is not visible from outside of the vehicle when the door is closed. The inner surface of the door may include a seal to prevent debris from entering the port.

SUMMARY

The present disclosure provides a close-out assembly for an external port of a vehicle. The close-out assembly includes a housing coupled to the external port and an inlet. The housing includes a face plate that defines an opening, and the housing includes a wall that surrounds the opening. The wall includes an outer edge adjacent to the face plate and includes an inner edge spaced from the outer edge. The inlet is coupled to the wall adjacent to the inner edge, and the inlet is accessible through the opening. The close-out assembly also includes a door coupled to the housing. The door is movable relative to the housing between an open position to access the inlet and a closed position to prevent access to the inlet. The close-out assembly further includes a seal formed to the wall at the outer edge of the wall and the inner edge of the wall. The door engages one part of the seal when the door is in the closed position, and the inlet engages another part of the seal regardless of the open and closed positions of the door.

The close-out assembly optionally includes one or more of the following:

A) the seal includes a first sealing portion formed to the outer edge, and a second sealing portion formed to the inner edge, and in certain configurations, formed via overmolding;

B) the seal includes an intermediate portion that is disposed along the wall between the outer and inner edges, and the intermediate portion connects to both of the first and second sealing portions;

C) the first sealing portion includes a first lip that engages the door when the door is in the closed position;

D) the second sealing portion includes a second lip that engages the inlet;

E) the one part of the seal includes the first lip, and the another part of the seal includes the second lip;

F) the housing defines an aperture, and the seal is disposed through the aperture to connect the first sealing portion and the intermediate portion;

G) the wall includes a first side facing the opening, and a second side opposing the first side;

H) the second side of the wall defines a recess, and the intermediate portion of the seal is disposed in the recess;

I) the housing includes a step disposed between the face plate and the wall;

J) the step defines a groove adjacent to the outer edge of the wall, and the first sealing portion of the seal is disposed in the groove;

K) the step defines a plurality of apertures spaced from each other, and the seal is disposed through each of the apertures;

L) the wall defines a plurality of recesses spaced from each other, and the recesses align with the respective apertures, and the seal is disposed in each of the recesses to connect the seal along the outer and inner edges of the wall;

M) the first lip projects outwardly away from the apertures and toward the door such that the first lip engages the door when the door is in the closed position;

N) the second lip projects outwardly away from the recesses and toward the inlet such that the second lip engages the inlet;

O) the step defines a first groove adjacent to the outer edge of the wall, and the seal is disposed in the first groove;

P) the inner edge of the wall defines a second groove, and the seal is disposed in the second groove;

Q) the door includes an inner wall that faces the face plate of the housing when the door is in the closed position;

R) the inner wall of the door is spaced from the seal when the door is in the open position;

S) the inner wall includes a face surface that is substantially flat, and the seal engages the face surface when the door is in the closed position;

T) the door includes a stepped portion that surrounds the face surface, and the stepped portion of the door is disposed inside the step of the housing when the door is in the closed position; and U) the seal is continuous around the outer edge of the wall and continuous around the inner edge of the wall.

The present disclosure also provides a method of manufacturing a close-out assembly for an external port of a vehicle. The method includes positioning a housing relative to a mold, and molding an elastomeric material to the housing using the mold to form a seal to the outer edge of the wall and to the inner edge of the wall.

The method optionally includes one or more of the following:

A) coupling together an inlet and the wall adjacent to the inner edge such that the inlet is accessible through the opening;

B) coupling the door to the housing, and the door is movable relative to the housing between an open position to access the inlet and a closed position to prevent access to the inlet;

C) molding the elastomeric material further includes forming a first sealing portion of the seal to the outer edge, forming a second sealing portion to the inner edge, and forming an intermediate portion to the wall between the outer and inner edges, and the intermediate portion connects to both of the first and second sealing portions;

D) forming the first sealing portion further includes forming a first lip that projects outwardly away from the opening;

E) forming the second sealing portion further includes forming a second lip that projects outwardly away from the opening; and F) molding the elastomeric material further includes overmolding the elastomeric material into a plurality of recesses of the wall and through a plurality of apertures of the housing which align with the respective recesses to form the seal having a first sealing portion formed to the outer edge, a second sealing portion formed to the inner edge, and an intermediate portion formed in the recesses.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
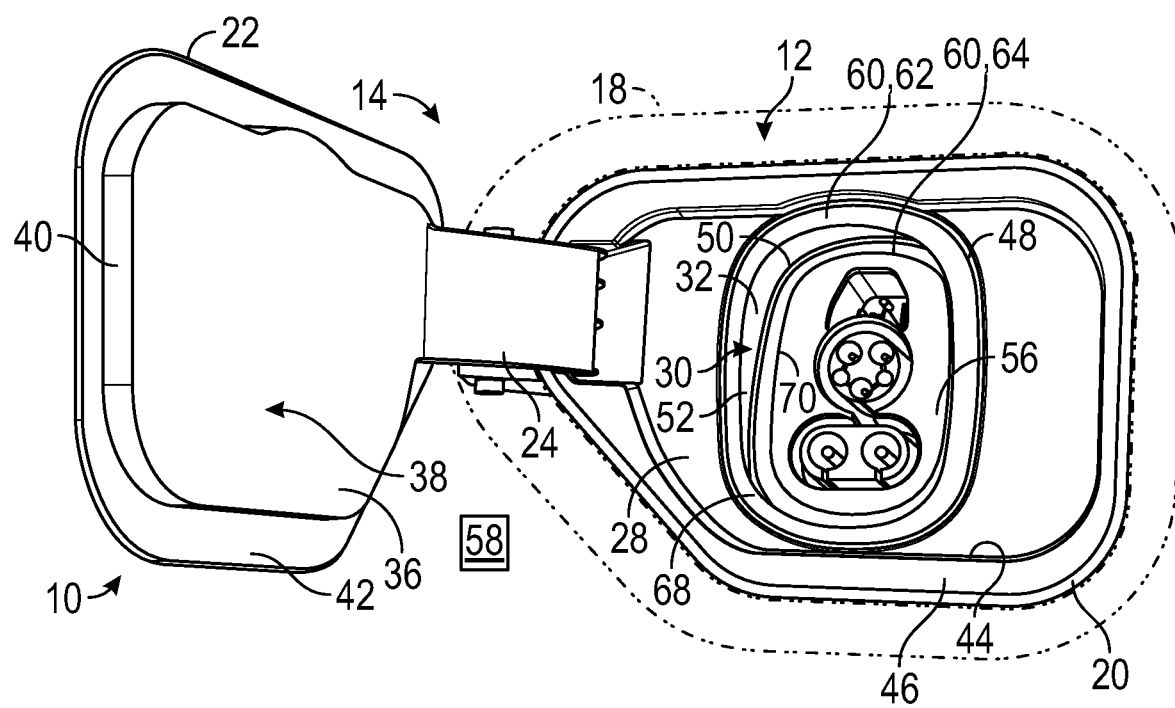
FIG. 1 is a schematic perspective view of a close-out assembly for an external port of a vehicle, with a door in an open position.

Referring to the FIGS., wherein like numerals indicate like or corresponding parts throughout the several views, a close-out assembly 10 for an external port 12 of a vehicle 14 is generally shown in FIG. 1. The external port 12 is accessible from outside of the vehicle 14. For example, the external port 12 may provide a location to charge the vehicle 14 or re-fuel the vehicle 14. The close-out assembly 10 provides a barrier to prevent ingress of particles, fragments, condensation, etc., into the external port 12. For example, the close-out assembly 10 may act as a dust inhibitor.

Non-limiting examples of the vehicle 14 may include a car, a truck, a motorcycle, an off-road vehicle, a farm vehicle, a watercraft, an aircraft, or any other suitable moveable platform. Additionally, the vehicle 14 may be a diesel/gas-powered vehicle, a hybrid vehicle, an electric vehicle, etc. It is to be appreciated that alternatively, the close-out assembly 10 may be used in non-vehicle applications, which may include farm equipment, stationary platforms, building equipment, structures, etc.

When the vehicle 14 is a hybrid vehicle 14 or an electric vehicle 14, the vehicle 14 may include one or more batteries 16 (see FIG. 5) that may be recharged. The hybrid or electric vehicle 14 may be recharged by providing an external power source to recharge the batteries 16. For example, the power source may be electricity that is delivered to the batteries 16 by various electrical components. Therefore, the vehicle 14 may be plugged in through the external port 12 to recharge the batteries 16. This type of vehicle 14 may be referred to as a plug-in hybrid vehicle 14 or a plug-in electric vehicle 14.

Referring to FIG. 1, the vehicle 14 may include one or more body panels 18 that provide an outer appearance to the vehicle 14. For illustrative purposes, FIG. 1 illustrates part of one body panel 18 in phantom lines. One or more of the body panels 18 may provide an access point for the external port 12. Therefore, the close-out assembly 10 is coupled to the body panels 18 at the external port 12.

Continuing with FIG. 1, the close-out assembly 10 includes a housing 20 coupled to the external port 12, and a door 22 coupled to the housing 20. More specifically, the housing 20 is coupled to one or more of the body panels 18 at the external port 12. Generally, the door 22 is movable relative to the body panels 18 to open and close the external port 12. More specifically, the door 22 is movable relative to the housing 20 between an open position and a closed position. The door 22 and the body panels 18 cooperate to provide an aesthetic appearance when the door 22 is in the closed position. More specifically, an outside of the door 22 is contoured to cooperate with an outside of the body panels 18 when the door 22 is in the closed position for aesthetic purposes.

A hinge 24 (as best shown in FIG. 1) may movably couple the door 22 to the housing 20. As such, the door 22 may be rotatable about the hinge 24 between the open and closed positions. For illustrative purposes, the door 22 is shown in the open position in FIG. 1, and the door 22 is shown in the closed position in FIGS. 4 and 5.

The housing 20 may include a sub-housing 26 (see FIG. 2) extending outwardly therefrom, and the housing may be fixed relative to the external port 12 via the sub-housing 26. The hinge 24 is disposed in, and attached to, the sub-housing 26. The sub-housing 26 is concealed internally inside the vehicle 14, and therefore, when the door 22 is in the open position, the sub-housing 26 is not visible.

Figure 2:
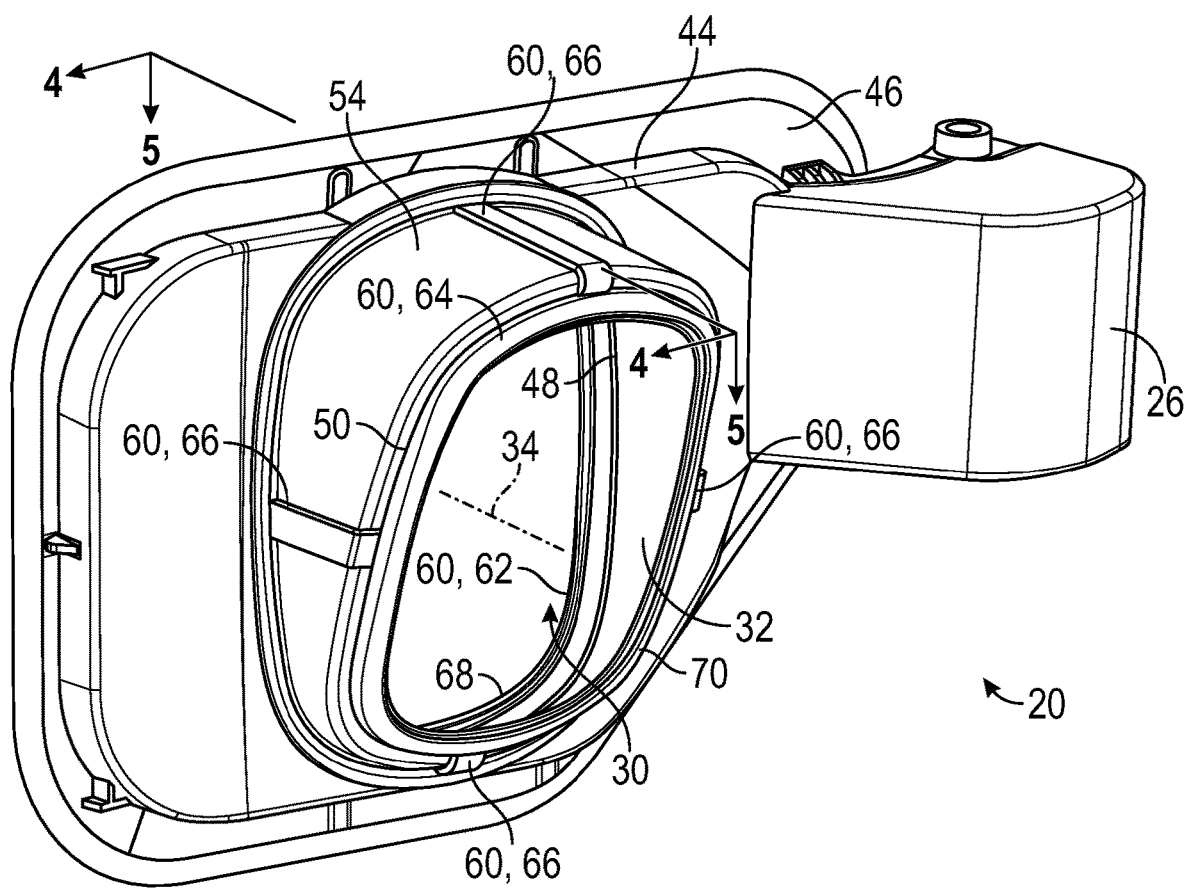
FIG. 2 is a schematic perspective internal side view of a housing and a seal, with an inlet removed.

Referring to FIGS. 1 and 2, the housing 20 includes a face plate 28 that defines an opening 30. Furthermore, the housing 20 includes a wall 32 that surrounds the opening 30. The opening 30 may extend away from the door 22 along an axis 34. The door 22 may include an inner wall 36 that faces the face plate 28 of the housing 20 when the door 22 is in the closed position. The inner wall 36 is disposed along an inside of the door 22, and thus, when the door 22 is in the closed position, the inner wall 36 is not visible from outside of the vehicle 14. The inner wall 36 may include a face surface 38 that is substantially flat. The face surface 38 may be characterized by the absence of a seal. In other words, there is no seal that extends from the face surface 38. Optionally, the inner wall 36 may be formed as one piece with the hinge 24. Furthermore, optionally, the door 22 and the inner wall 36 may be formed of separate pieces that are attached or fixed to each other by any suitable method.

Figure 5:
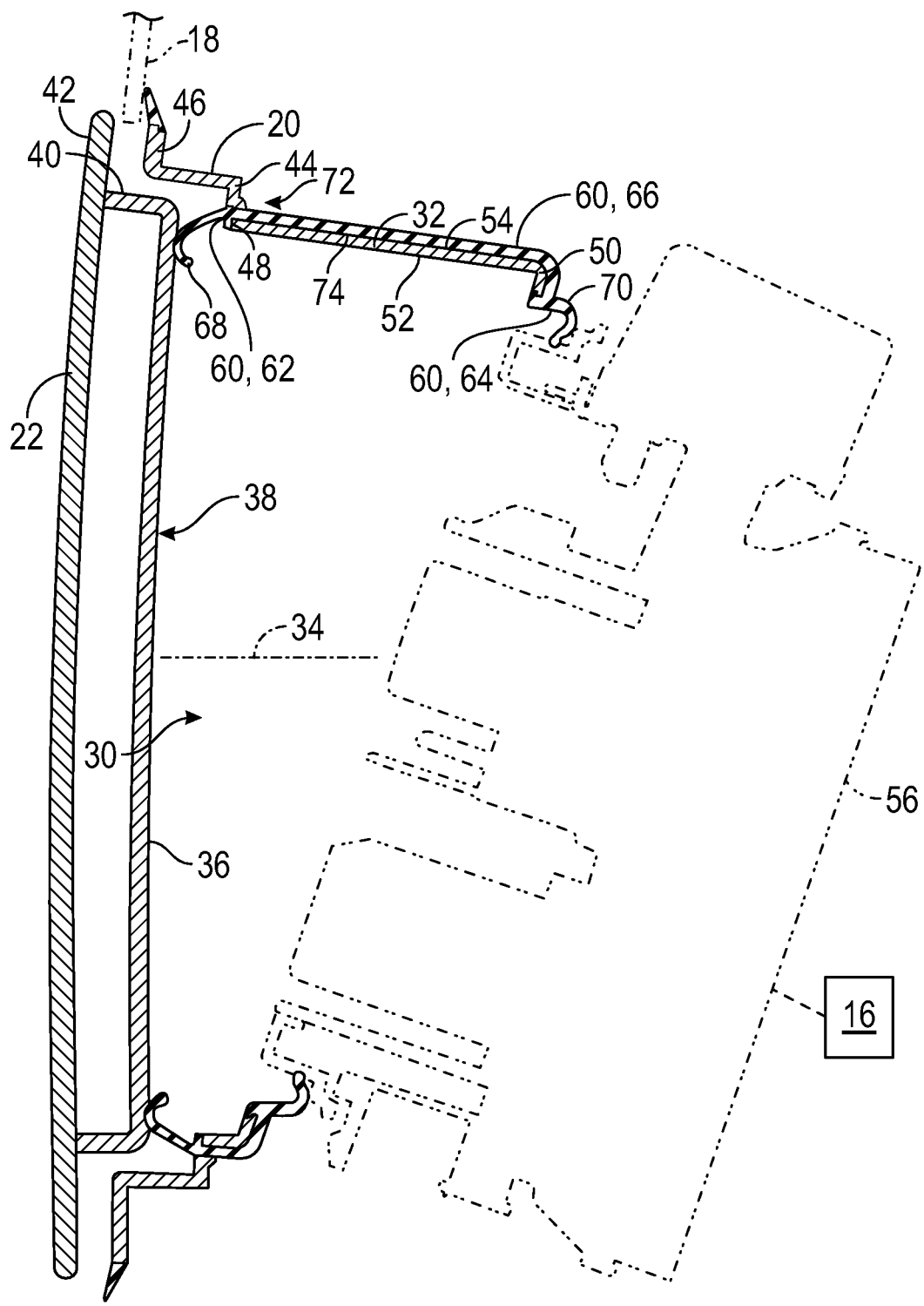
FIG. 5 is a schematic fragmentary enlarged cross-sectional view of the housing and the seal taken from lines 5-5 of FIG. 2, with the door in the closed position and the inlet (in phantom lines) disposed relative to the housing and the seal.

In addition, optionally, the door 22 may include a stepped portion 40 that surrounds the face surface 38. Referring to FIG. 5, the stepped portion 40 may cooperate with part of the housing 20 to allow part of the inner wall 36 to be disposed inside part of the housing 20. More specifically, the stepped portion 40 creates a flange 42 around the inner wall 36 of the face surface 38, and the flange 42 overlaps a portion of the housing 20 when the door 22 is in the closed position. The door 22 and the inner wall 36 may cooperate with each other to present the stepped portion 40 and the flange 42 relative to the inside of the door 22.

Optionally, the housing 20 may include a step 44 disposed between the face plate 28 and the wall 32. The step 44 of the housing 20 creates a flange 46 around the face plate 28. The stepped portion 40 of the door 22 is disposed inside the step 44 of the housing 20 when the door 22 is in the closed position. Therefore, the stepped portion 40 of the door 22 and the step 44 of the housing 20 cooperate such that part of the inner wall 36 sits inside part of the housing 20. As best shown in FIG. 5, the flange 42 of the door 22 and the flange 46 of the housing 20 may be generally parallel to each other, and may be spaced from each other.

Referring to FIGS. 1 and 2, and turning back to the wall 32, the wall 32 surrounds the opening 30, and therefore, the wall 32 also surrounds the axis 34. The wall 32 includes an outer edge 48 adjacent to the face plate 28 and includes an inner edge 50 spaced from the outer edge 48. Generally, the outer and inner edges 48, 50 oppose each other. The outer and inner edges 48, 50 surround the axis 34, and therefore, the outer and inner edges 48, 50 are spaced from the axis 34. The opening 30 is disposed between the outer and inner edges 48, 50 relative to the axis 34.

The inner edge 50 may be spaced farther from the face plate 28 than is the outer edge 48. As such, the inner edge 50 is recessed back farther from the door 22 than is the outer edge 48. In other words, the outer edge 48 is disposed closer to the door 22 than is the inner edge 50. In certain configurations, the wall 32 may be an asymmetric configuration. In other words, part of the wall 32 may be larger than another part of the wall 32. As such, the inner edge 50 may be angled or tapered differently than the outer edge 48. For example, the inner edge 50 above the axis 34 relative to FIG. 2 may be farther from the outer edge 48 than the inner edge 50 below the axis 34, which causes the wall 32 to be larger above the axis 34 than below the axis 34. It is to be appreciated that the wall 32 may be different configurations than illustrated, and this is one non-limiting example.

Referring to FIGS. 1 and 2, the wall 32 may include a first side 52 facing the opening 30, and a second side 54 opposing the first side 52. Therefore, the first side 52 of the wall 32 may be visible when the door 22 is in the open position as shown in FIG. 1. The second side 54 of the wall 32 is not visible from outside of the vehicle 14 regardless of the position of the door 22, as also shown in FIG. 1. Therefore, the second side 54 of the wall 32 is concealed internally inside the vehicle 14.

Referring to FIGS. 1 and 5, the close-out assembly 10 further includes an inlet 56 coupled to the wall 32 adjacent to the inner edge 50. The inlet 56 is accessible through the opening 30. The inlet 56 may include various electrical components to plug-in and recharge the batteries 16. Therefore, the inlet 56 may be in electrical communication with the batteries 16 to recharge the batteries 16. An external plug 58 may engage the inlet 56 to deliver the electricity to the batteries 16 to recharge the batteries 16. The external plug 58 may include various electrical components to connect to the inlet 56, and deliver the electricity to the batteries 16.

As mentioned above, the door 22 is movable. Specifically, the door 22 may be movable relative to the housing 20 between the open position to access the inlet 56 and the closed position to prevent access to the inlet 56. Therefore, when the door 22 is in the closed position, the external plug 58 cannot access the inlet 56.

Referring to FIGS. 2-5, the close-out assembly 10 also includes a seal 60 disposed inside the housing 20. The seal 60 engages the face surface 38 of the door 22 when the door 22 is in the closed position. However, the seal 60 is not fixed or attached to the door 22. The door 22 is movable independently of the seal 60 between the open and closed positions. Therefore, the inner wall 36 of the door 22 is spaced from the seal 60 when the door 22 is in the open position. The seal 60 cooperates with the door 22 when the door 22 is in the closed position to prevent dust etc., from entering the inlet 56. Therefore, the seal 60 provides a barrier to prevent ingress of particles, fragments, condensation, etc., into the inlet 56 through the door 22. Additionally, the seal 60 provides a barrier to prevent ingress of particles, fragments, condensation, etc., behind the inlet 56 regardless of the position of the door 22, and thus, internally to the vehicle 14.

Generally, the seal 60 is secured to or fixed to the wall 32, and provides a visual close-out around the inlet 56. More specifically, the seal 60 is formed to the wall 32 at the outer edge 48 of the wall 32 and the inner edge 50 of the wall 32. In certain configurations, the seal 60 is continuous around the outer edge 48 of the wall 32 and continuous around the inner edge 50 of the wall 32. The door 22 engages one part of the seal 60 when the door 22 is in the closed position, and the inlet 56 engages another part of the seal 60 regardless of the open and closed positions of the door 22. Specifically, the door 22 engages the part of the seal 60 along the outer edge 48 of the wall 32, and the inlet 56 engages the another part of the seal 60 along the inner edge 50 of the wall 32.

Continuing with FIGS. 2-5, the seal 60 may include multiple portions to prevent ingress of particles, fragments, condensation, into the inlet 56 and behind the inlet 56. The seal 60 may include a first sealing portion 62 formed to the outer edge 48, and a second sealing portion 64 formed to the inner edge 50. In certain configurations, the first and second sealing portions 62, 64 are formed to the outer and inner edges 48, 50 respectively via overmolding. The first and second sealing portions 62, 64 are visible when the door 22 is in the open position (see FIG. 1). In certain configurations, the first sealing portion 62 is continuous around the outer edge 48, and the second sealing portion 64 is continuous around the inner edge 50.

The seal 60 may also include an intermediate portion 66 that is disposed along the wall 32 between the outer and inner edges 48, 50. The intermediate portion 66 connects to both of the first and second sealing portions 62, 64. Therefore, the intermediate portion 66 of the seal 60 is disposed between the first and second sealing portions 62, 64. Generally, the intermediate portion 66 is disposed along the second side 54 of the wall 32, and thus, is not visible from the opening 30. In other words, the intermediate portion 66 of the seal 60 is concealed behind the wall 32. In certain configurations, the intermediate portion 66 may be formed to the second side 54 of the wall 32 via overmolding. It is to be appreciated that a plurality of intermediate portions 66 may be used.

As best shown in FIG. 5, the first sealing portion 62 may include a first lip 68 that engages the door 22 when the door 22 is in the closed position. Furthermore, the second sealing portion 64 may include a second lip 70 that engages the inlet 56. The first and second lips 68, 70 may be any suitable configuration to prevent ingress of dust, etc., into the external port 12. In certain configurations, the one part of the seal 60 includes the first lip 68, and the another part of the seal 60 includes the second lip 70.

Figure 3:
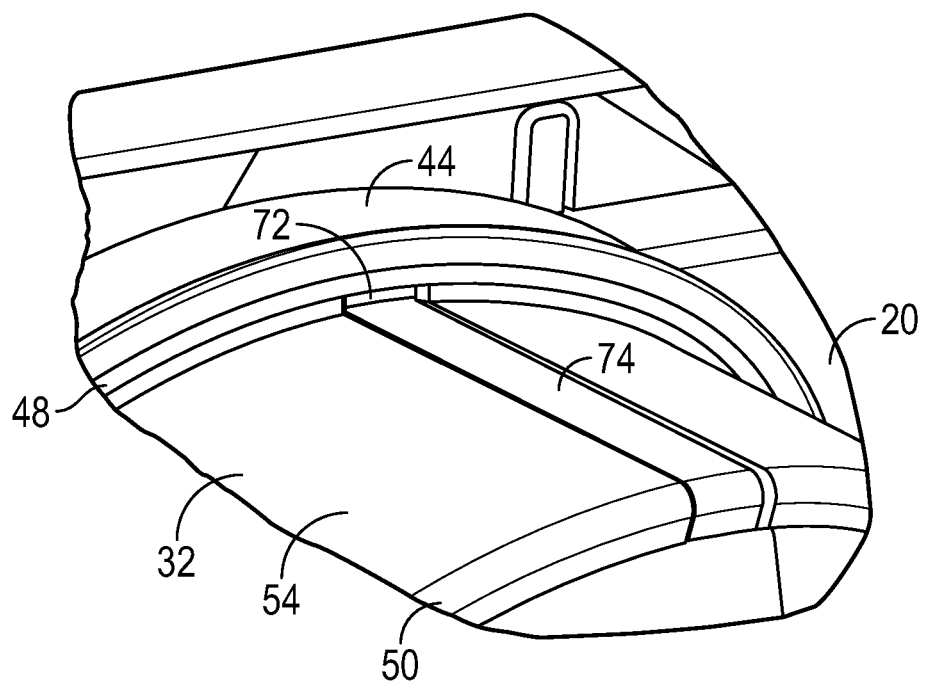
FIG. 3 is a schematic enlarged perspective view of an aperture and a recess of the housing.

As best shown in FIG. 3, the housing 20 may define an aperture 72. Generally, the seal 60 is disposed through the aperture 72. More specifically, the seal 60 is disposed through the aperture 72 to connect the first sealing portion 62 and the intermediate portion 66. Specifically, the aperture 72 provides an access point to connect together the first and second sealing portions 62, 64 and the intermediate portion 66.

In certain configurations, the aperture 72 may be further defined as a plurality of apertures 72, and the apertures 72 are spaced from each other. Specifically, the apertures 72 may be spaced from each other around the outer edge 48 of the wall 32. In this configuration, the seal 60 is disposed through each of the apertures 72. The first lip 68 of the first sealing portion 62 may project outwardly away from the apertures 72 and toward the door 22 such that the first lip 68 engages the door 22 when the door 22 is in the closed position. In certain configurations, the step 44 may define the aperture 72, and more specifically the apertures 72. For illustrative purposes, referring to FIG. 2, four apertures 72 are defined through the housing 20, and therefore, creates four access points with four intermediate portions 66 used to connect together the first and second sealing portions 62, 64.

Furthermore, the wall 32 may define a recess 74 (as best shown in FIG. 3), and more specifically, in certain configurations, the second side 54 of the wall 32 may define the recess 74. Generally, the recess 74 is concealed behind the wall 32. The recess 74 and the aperture 72 may be disposed adjacent to each other, and thus, cooperate with each other. More specifically, the aperture 72 and the recess 74 align with each other.

The recess 74 may act as a channel for part of the seal 60. Generally, the intermediate portion 66 of the seal 60 is disposed in the recess 74. In certain configurations, the recess 74 may be further defined as a plurality of recesses 74, and the recesses 74 are spaced from each other. Specifically, the recesses 74 may be spaced from each other around the second side 54 of the wall 32. Each of the recesses 74 may act as respective channels for parts of seal 60. For illustrative purposes, referring to FIG. 2, four recesses 74 are defined via the wall 32, and therefore, creates four locations for the four intermediate portions 66. The recesses 74 align with the respective apertures 72, and the seal 60 is disposed in each of the recesses 74 to connect the seal 60 along the outer and inner edges 48, 50 of the wall 32. The second lip 70 of the second sealing portion 64 may project outwardly away from the recesses 74 and toward the inlet 56 such that the second lip 70 engages the inlet 56.

Figure 4:
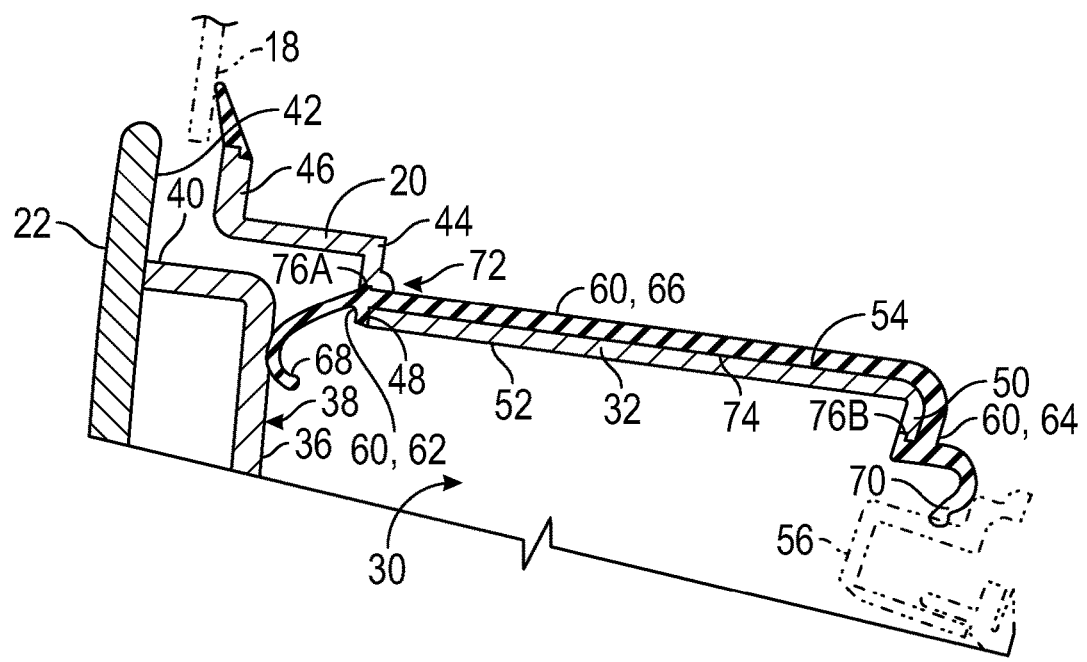
FIG. 4 is a schematic fragmentary cross-sectional view of the housing and the seal taken from lines 4-4 of FIG. 2, with the door in a closed position and the inlet (in phantom lines) disposed relative to the housing and the seal.

Referring to FIG. 4, the housing 20 may include various locations with one or more features to provide additional surface area for the seal 60 to mount to, or form to, along the wall 32. The additional surface area to mount or form the seal 60 to provides a greater connection between the seal 60 and the wall 32. For example, the wall 32 may define a groove 76A, 76B or a plurality of grooves 76A, 76B, which presents additional locations of surface areas that the seal 60 may mount/form to along the wall 32. In certain configurations, the step 44 may define the groove 76A, 76B adjacent to the outer edge 48 of the wall 32, and in this configuration, the first sealing portion 62 of the seal 60 is disposed in the groove 76A, 76B. In other configurations, the inner edge 50 of the wall 32 may define the groove 76A, 76B, and in this configuration, the second sealing portion 64 of the seal 60 is disposed in the groove 76A, 76B. It is to be appreciated that the grooves 76A, 76B may be continuous around the outer and inner edges 48, 50 of the wall 32.

In certain configurations, one of the grooves 76A, 76B is disposed along the outer edge 48 of the wall 32, and another one of the grooves 76A, 76B is disposed along the inner edge 50 of the wall 32. Furthermore, in certain configurations, the step 44 may define the groove 76A, 76B. Therefore, in certain configurations, the step 44 may define a first groove 76A adjacent to the outer edge 48 of the wall 32, and the first sealing portion 62 of the seal 60 is disposed in the first groove 76A. Additionally, the inner edge 50 of the wall 32 may define a second groove 76B, and the second sealing portion 64 of the seal 60 is disposed in the second groove 76B.

The present disclosure also provides a method of manufacturing the close-out assembly 10 for the external port 12 of the vehicle 14. The close-out assembly 10 is ultimately attached to the vehicle 14 at the external port 12.

A mold is used to form the seal 60 to the housing 20. Therefore, the housing 20 is positioned relative to the mold. The mold provides the final configuration of the seal 60 when the molding process is complete. By using this molding process, manufacturing costs of the close-out assembly 10 may be reduced while also providing a robust product with an aesthetic appearance. Any suitable type of the mold may be used. Furthermore, as non-limiting examples, the molding process to form the seal 60 to the housing 20 may be via overmolding, extrusion molding, injection molding, or any other suitable molding process.

An elastomeric material is disposed in the mold relative to the housing 20 to form the seal 60. Therefore, the elastomeric material is molded to the housing 20 using the mold to form the seal 60 to the outer edge 48 of the wall 32 and to the inner edge 50 of the wall 32. More specifically, molding the elastomeric material may further include forming the first sealing portion 62 of the seal 60 to the outer edge 48, forming the second sealing portion 64 of the seal 60 to the inner edge 50, and forming the intermediate portion 66 to the wall 32 between the outer and inner edges 48, 50. As discussed above, the intermediate portion 66 connects to both of the first and second sealing portions 62, 64.

Additionally, molding the elastomeric material may further include disposing the elastomeric material through the apertures 72 of the housing 20 and into the recesses 74 of the wall 32 which align with the respective apertures 72 to form the seal 60 having the first sealing portion 62 formed to the outer edge 48, the second sealing portion 64 formed to the inner edge 50, and the intermediate portions 66 disposed in the respective recesses 74 and each connect to the first and second sealing portions 62, 64. In certain configurations, molding the elastomeric material may further include overmolding the elastomeric material into the recesses 74 of the wall 32 and through the apertures 72 of the housing 20 which align with the respective recesses 74 to form the seal 60 having the first sealing portion 62 formed to the outer edge 48, the second sealing portion 64 formed to the inner edge 50, and the intermediate portions 66 formed in the respective recesses 74. Therefore, the recesses 74 act as material runner channels to direct the elastomeric material from the intermediate portions 66 to the outer edge 48 and the inner edge 50 without using any other tool action.

In certain configurations, molding the elastomeric material further includes overmolding the elastomeric material to form the seal 60. More specifically, overmolding the elastomeric material may include overmolding the elastomeric material to the outer edge 48 to form the first sealing portion 62, to the inner edge 50 portion to form the second sealing portion 64, and to the second side 54 of the wall 32 in the recess 74 to form the intermediate portion 66. In certain configurations, the elastomeric material is overmolded to the recesses 74 to form the respective intermediate portions 66. By utilizing overmolding, the entire seal 60 may be formed in a single overmolding operation.

The housing 20 may be formed of a more rigid or harder material than the material that forms the seal 60. In other words, the elastomeric material that forms the seal 60 is more flexible or softer than the material that forms the housing 20. For example, the housing 20 may be formed of a polymer, and one non-limiting example may be a glass-filled polypropylene. The seal 60 may be formed of the elastomeric material, and one non-limiting example may be rubber.

Forming the first sealing portion 62 and the second sealing portion 64 may further include forming the first lip 68 and the second lip 70 by using the mold. In certain configurations, forming the first sealing portion 62 may further include forming the first lip 68 that projects outwardly away from the opening 30. Therefore, the first lip 68 projects outwardly toward the door 22 such that the first lip 68 engages the door 22 when the door 22 is in the closed position. Additionally, in certain configurations, forming the second sealing portion 64 may further include forming the second lip 70 that projects outwardly away from the opening 30. Therefore, the second lip 70 projects outwardly toward the inlet 56 such that the second lip 70 engages the inlet 56.

After the seal 60 has been formed to the housing 20, the door 22 may be coupled to the housing 20 and the inlet 56 may be disposed relative to the housing 20. Therefore, the inlet 56 and the wall 32 may be coupled together adjacent to the inner edge 50 such that the inlet 56 is accessible through the opening 30. The door 22 may be coupled to the housing 20 before or after the inlet 56 and the wall 32 are coupled together. As discussed above, the door 22 is movable relative to the housing 20 between the open position to access the inlet 56 and the closed position to prevent access to the inlet 56.

It is to be appreciated that the order or sequence of performing the method is for illustrative purposes and other orders or sequences are within the scope of the present teachings. It is to also be appreciated that the method may include other features discussed herein.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A close-out assembly for an external port of a vehicle; the close-out assembly comprising:
    a housing coupled to the external port, and the housing includes a face plate that defines an opening and includes a wall that surrounds the opening;
    wherein the wall includes an outer edge adjacent to the face plate and includes an inner edge spaced from the outer edge;
    an inlet coupled to the wall adjacent to the inner edge, and the inlet is accessible through the opening;
    a door coupled to the housing, and movable relative to the housing between an open position to access the inlet and a closed position to prevent access to the inlet; and
    a seal formed to the wall at the outer edge of the wall and the inner edge of the wall, and the door engages one part of the seal when the door is in the closed position, and the inlet engages another part of the seal regardless of the open and closed positions of the door.

2. The assembly as set forth in claim 1 wherein the seal includes a first sealing portion formed to the outer edge, and a second sealing portion formed to the inner edge.

3. The assembly as set forth in claim 2 wherein:
    the first sealing portion includes a first lip that engages the door when the door is in the closed position;
    the second sealing portion includes a second lip that engages the inlet; and
    the one part of the seal includes the first lip, and the another part of the seal includes the second lip.

4. The assembly as set forth in claim 2 wherein the seal includes an intermediate portion that is disposed along the wall between the outer and inner edges, and the intermediate portion connects to both of the first and second sealing portions.

5. The assembly as set forth in claim 4 wherein the housing defines an aperture, and the seal is disposed through the aperture to connect the first sealing portion and the intermediate portion.

6. The assembly as set forth in claim 5 wherein:
    the wall includes a first side facing the opening, and a second side opposing the first side, and
    the second side of the wall defines a recess, and the intermediate portion of the seal is disposed in the recess.

7. The assembly as set forth in claim 5 wherein:
    the housing includes a step disposed between the face plate and the wall; and
    the step defines a groove adjacent to the outer edge of the wall, and the first sealing portion of the seal is disposed in the groove.

8. The assembly as set forth in claim 1 wherein the housing includes a step disposed between the face plate and the wall.

9. The assembly as set forth in claim 8 wherein the step defines a plurality of apertures spaced from each other, and the seal is disposed through each of the apertures.

10. The assembly as set forth in claim 9 wherein the wall defines a plurality of recesses spaced from each other, and the recesses align with the respective apertures, and the seal is disposed in each of the recesses to connect the seal along the outer and inner edges of the wall.

11. The assembly as set forth in claim 10 wherein:
    the seal includes a first sealing portion formed to the outer edge via overmolding, and a second sealing portion formed to the inner edge via overmolding;
    the first sealing portion includes a first lip that projects outwardly away from the apertures and toward the door such that the first lip engages the door when the door is in the closed position;
    the second sealing portion includes a second lip that projects outwardly away from the recesses and toward the inlet such that the second lip engages the inlet; and
    the one part of the seal includes the first lip, and the another part of the seal includes the second lip.

12. The assembly as set forth in claim 8 wherein:
    the step defines a first groove adjacent to the outer edge of the wall, and the seal is disposed in the first groove; and
    the inner edge of the wall defines a second groove, and the seal is disposed in the second groove.

13. The assembly as set forth in claim 1 wherein:
    the door includes an inner wall that faces the face plate of the housing when the door is in the closed position;
    the inner wall of the door is spaced from the seal when the door is in the open position; and
    the inner wall includes a face surface that is substantially flat, and the seal engages the face surface when the door is in the closed position.

14. The assembly as set forth in claim 13 wherein the housing includes a step disposed between the face plate and the wall, and the door includes a stepped portion that surrounds the face surface, and the stepped portion of the door is disposed inside the step of the housing when the door is in the closed position.

15. The assembly as set forth in claim 1 wherein the seal is continuous around the outer edge of the wall and continuous around the inner edge of the wall.

16. A method of manufacturing a close-out assembly for an external port of a vehicle; the method comprising:
 positioning a housing relative to a mold, and wherein the housing includes a face plate that defines an opening, and the housing includes a wall that surrounds the opening, and the wall includes an outer edge adjacent to the face plate, and the wall includes an inner edge spaced from the outer edge, and the inner edge is spaced farther from the face plate than is the outer edge;
 molding an elastomeric material to the housing using the mold to form a seal to the outer edge of the wall and to the inner edge of the wall;
 coupling together an inlet and the wall adjacent to the inner edge such that the inlet is accessible through the opening; and
 coupling a door to the housing, and the door is movable relative to the housing between an open position to access the inlet and a closed position to prevent access to the inlet, and wherein the door engages one part of the seal when the door is in the closed position, and the inlet engages another part of the seal regardless of the open and closed positions of the door.

17. The method as set forth in claim 16 wherein molding the elastomeric material further comprises forming a first sealing portion of the seal to the outer edge, forming a second sealing portion of the seal to the inner edge, and forming an intermediate portion to the wall between the outer and inner edges, and the intermediate portion connects to both of the first and second sealing portions.

18. The method as set forth in claim 17 wherein:
 forming the first sealing portion further comprises forming a first lip that projects outwardly away from the opening; and
 forming the second sealing portion further comprises forming a second lip that projects outwardly away from the opening.

19. The method as set forth in claim 16 wherein molding the elastomeric material further comprises overmolding the elastomeric material into a plurality of recesses of the wall and through a plurality of apertures of the housing which align with the respective recesses to form the seal having a first sealing portion formed to the outer edge, a second sealing portion formed to the inner edge, and a plurality of intermediate portions formed in the respective recesses.

\* \* \* \* \*